(12) United States Patent
Liu et al.

(10) Patent No.: US 11,725,601 B1
(45) Date of Patent: Aug. 15, 2023

(54) SYSTEMS AND METHODS FOR RECIRCULATION OF ENGINE EXHAUST GAS WITHIN AN EXHAUST SYSTEM

(71) Applicant: GM GLOBAL TECHNOLOGY OPERATIONS LLC, Detroit, MI (US)

(72) Inventors: Chengke Liu, Novi, MI (US); Rafat F. Hattar, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/937,799

(22) Filed: Oct. 4, 2022

(51) Int. Cl.
*F02D 41/00* (2006.01)
*F01N 3/20* (2006.01)

(52) U.S. Cl.
CPC ....... *F02D 41/0072* (2013.01); *F01N 3/2006* (2013.01); *F01N 2260/08* (2013.01); *F02D 2200/0802* (2013.01); *F02D 2200/1002* (2013.01)

(58) Field of Classification Search
CPC ......... F02D 41/0072; F02D 2200/0802; F02D 2200/1002; F01N 3/2006; F01N 2260/08
USPC ......... 123/568.19, 568.21; 60/296, 307, 315, 60/324
See application file for complete search history.

(56) References Cited

FOREIGN PATENT DOCUMENTS

| CN | 103256105 | * | 6/2015 | ............... F01N 3/24 |
| JP | 2005016317 | * | 1/2005 | ............. F02D 41/04 |
| JP | 4122849 | * | 7/2008 | ............... F01N 3/20 |
| JP | 2017036671 | * | 2/2017 | ............... F01N 3/24 |

* cited by examiner

*Primary Examiner* — Hai H Huynh
(74) *Attorney, Agent, or Firm* — Lorenz & Kopf LLP

(57) ABSTRACT

Methods and systems are provided for recirculation of an engine exhaust gas. The system includes an engine, an exhaust system configured to channel exhaust gas from the engine to an outlet, an aftertreatment device, an exhaust recirculation system configured to divert at least some of the exhaust gas as recirculated exhaust gas from a first position in the exhaust system downstream of the aftertreatment device, through a housing enclosing the aftertreatment device, and to a second position in the exhaust system upstream of the aftertreatment device, wherein the recirculated exhaust gas is combined with the exhaust gas at the second position, a controller configured to, by a processor, selectively operate the exhaust recirculation system to control the exhaust recirculation system to divert the exhaust gas and thereby cause the recirculated exhaust gas to be treated with the aftertreatment device more than once.

20 Claims, 6 Drawing Sheets

SYSTEMS AND METHODS FOR RECIRCULATION OF ENGINE EXHAUST GAS WITHIN AN EXHAUST SYSTEM

INTRODUCTION

The technical field generally relates to vehicle emissions, and more particularly relates to systems and methods for improving emission control while operating an engine, for example, under cold-start and/or low load conditions.

When an internal combustion engine is started, it generally requires a period of time to increase to a normal operating temperature, typically 5-60 seconds after ignition. Therefore, the engine will initially operate under what is referred to herein as cold-start conditions during which the engine, the lubricant therein (e.g., oil), and exhaust gas produce thereby are below normal operating temperatures.

Vehicles having internal combustion engines typically have one or more emissions control systems that include aftertreatment devices, such as a catalytic converter, for controlling vehicle emissions. While these emissions control systems may significantly improve air quality expelled from the vehicles, in certain situations, control of vehicle emissions may not always be optimal. For example, the aftertreatment devices typically do not reach full efficiency until the engine exhaust gas heats a catalyst to a reaction temperature. As such, during cold-start and/or low load conditions, a vehicle may emit substantially more harmful emissions than while running at normal operating temperatures.

Accordingly, it is desirable to provide systems and methods that are capable of reducing vehicle emissions while operating under cold-start and/or low load conditions. Furthermore, other desirable features and characteristics of the present invention will become apparent from the subsequent detailed description and the appended claims, taken in conjunction with the accompanying drawings and the foregoing technical field and background.

SUMMARY

A method is provided for recirculation of engine exhaust gas. In one embodiment, the method includes initiating operation of an engine to consume fuel and air and thereby generate exhaust gas, channeling, through an exhaust system, the exhaust gas within a primary exhaust gas stream from the engine to an outlet for emissions, performing a first treatment on the exhaust gas within the primary exhaust gas stream with an aftertreatment device of the exhaust system, and performing an exhaust gas recirculation process that includes: diverting, from a first position in the exhaust system downstream of the aftertreatment device, at least some of the exhaust gas within the primary exhaust gas stream into an exhaust recirculation system as recirculated exhaust gas, wherein the recirculated exhaust gas within the exhaust recirculation system defines a secondary exhaust gas stream, channeling the recirculated gas into a cavity of a housing that encloses the aftertreatment device, the cavity defined between interior surfaces of the housing and exterior surfaces of the aftertreatment device, wherein at least some of the recirculated exhaust gas within the secondary exhaust gas stream contacts the exterior surfaces of the aftertreatment device, channeling the recirculated exhaust gas within the secondary exhaust gas stream from the cavity to a second position in the exhaust system upstream of the aftertreatment device, wherein the recirculated exhaust gas of the secondary exhaust gas stream is combined with the exhaust gas of the primary exhaust gas stream at the second position, and performing a second treatment on the recirculated exhaust gas within the primary exhaust gas stream with the aftertreatment device.

In various embodiments, the method includes initiating the exhaust gas recirculation process in response to initiation of the operation of the engine, and ending performance of the exhaust gas recirculation process after the engine has been operating for a predetermined period of time.

In various embodiments, the method includes sensing a temperature of the exhaust gas and/or a catalyst of the aftertreatment device or simulating the temperature of the exhaust gas and/or the catalyst of the aftertreatment device based on operating conditions of the engine and/or exhaust system, sensing a flow rate of the exhaust gas or simulate the flow rate of the exhaust gas based on operating conditions of the engine and/or exhaust system, initiating the exhaust gas recirculation process in response to the sensed or simulated temperature of the exhaust gas and/or the catalyst being below a predetermined threshold corresponding to the sensed or simulated flow rate, and ending performance of the exhaust gas recirculation process after the sensed or simulated temperature of the exhaust gas and/or catalyst is equal to or above the predetermined threshold corresponding to the sensed or simulated flow rate.

In various embodiments, the method includes selectively controlling, with the processor, a volume and/or a pressure of the recirculated exhaust gas within the secondary exhaust gas stream based on the sensed or simulated temperature of the exhaust gas and/or the catalyst and the sensed or simulated flow rate prior to the sensed or simulated temperature of the exhaust gas and/or catalyst being equal to or above the predetermined threshold at the sensed or simulated flow rate, wherein controlling the volume and/or pressure of the recirculated exhaust gas includes controlling a position of an exhaust valve configured to selectively divert the exhaust gas from the primary exhaust gas stream to the secondary exhaust gas stream and controlling an operating speed of a recirculation pump configured to pump at least some of the exhaust gas from the primary exhaust gas stream through the secondary exhaust gas stream. In an embodiment, operation of the recirculation pump increases back pressures and temperatures of the recirculated exhaust gas by adding pumping work to the recirculated exhaust gas and increasing torque requirements of the engine during idling and partial load conditions.

In various embodiments, during the exhaust gas recirculation process, heat is transferred by convection from the recirculated exhaust gas to the exterior surfaces of the aftertreatment device as the recirculated exhaust gas flows through the cavity of the housing, and to interior surfaces of the aftertreatment device as the recirculated exhaust gas flows through the aftertreatment device during the second treatment.

In various embodiments, the method includes performing a third treatment on the recirculated exhaust gas within the primary exhaust gas stream with an additional aftertreatment device of the exhaust system downstream from the aftertreatment device, wherein the second position in the exhaust system is upstream from the additional aftertreatment device.

In various embodiments, the engine is a gasoline or diesel engine and the fuel is gasoline or diesel.

In various embodiments, the aftertreatment device comprises a catalytic converter.

A system is provided for recirculation of engine exhaust gas. In one embodiment, the system includes an engine configured to consume fuel and air and thereby generate exhaust gas, an exhaust system configured to channel the exhaust gas within a primary exhaust gas stream from the engine to an outlet for emissions, an aftertreatment device in the exhaust system, an exhaust recirculation system configured to divert at least some of the exhaust gas within the primary exhaust gas stream as recirculated exhaust gas from a first position in the exhaust system downstream of the aftertreatment device, through a cavity defined between interior surfaces of a housing that encloses the aftertreatment device and exterior surfaces of the aftertreatment device such that at least some of the recirculated exhaust gas within the secondary exhaust gas stream contacts the exterior surfaces of the aftertreatment device, and from the housing to a second position in the exhaust system upstream of the aftertreatment device, wherein the recirculated exhaust gas defines a secondary exhaust gas stream within the exhaust recirculation system, wherein the recirculated exhaust gas within the secondary exhaust gas stream is combined with the exhaust gas within the primary exhaust gas stream at the second position, and a controller configured to, by a processor, selectively operate the exhaust recirculation system to perform an exhaust gas recirculation process that includes controlling the exhaust recirculation system to divert the exhaust gas from the primary exhaust gas stream to the secondary exhaust gas stream and thereby cause the recirculated exhaust gas within the secondary exhaust gas stream to be treated with the aftertreatment device more than once.

In various embodiments, the controller is configured to, by the processor: initiate the exhaust gas recirculation process in response to initiation of the operation of the engine, and end the exhaust gas recirculation process after the engine has been operating for a predetermined period of time.

In various embodiments, the controller is configured to, by the processor: sense a temperature of the exhaust gas and/or a catalyst of the aftertreatment device or simulate the temperature of the exhaust gas and/or the catalyst of the aftertreatment device based on operating conditions of the engine and/or exhaust system, sense a flow rate of the exhaust gas or simulate the flow rate of the exhaust gas based on operating conditions of the engine and/or exhaust system, initiate the exhaust gas recirculation process in response to the sensed or simulated temperature of the exhaust gas and/or the catalyst being below a predetermined threshold at the sensed or simulated flow rate, and end performance of the exhaust gas recirculation process after the sensed or simulated temperature of the exhaust gas and/or catalyst is equal to or above the predetermined threshold at the sensed or simulated flow rate.

In various embodiments, the controller is configured to, by the processor: selectively control, with the processor, a volume and/or a pressure of the recirculated exhaust gas within the secondary exhaust gas stream based on the sensed or simulated temperature of the exhaust gas and/or the catalyst and the sensed or simulated flow rate prior to the sensed or simulated temperature of the exhaust gas and/or catalyst being equal to or above the predetermined threshold at the sensed or simulated flow rate, wherein controlling the volume and/or pressure of the recirculated exhaust gas includes controlling a position of an exhaust valve configured to selectively divert the exhaust gas from the primary exhaust gas stream to the secondary exhaust gas stream and controlling an operating speed of a recirculation pump configured to pump at least some of the exhaust gas from the primary exhaust gas stream through the secondary exhaust gas stream. In various embodiments, operation of the recirculation pump increases back pressures and temperatures of the recirculated exhaust gas by adding pumping work to the recirculated exhaust gas and increasing torque requirements of the engine during idling and partial load conditions.

In various embodiments, during the exhaust gas recirculation process, the exhaust recirculation system is configured to transfer heat by convection from the recirculated exhaust gas to the exterior surfaces of the aftertreatment device as the recirculated exhaust gas flows through the cavity of the housing, and to interior surfaces of the aftertreatment device as the recirculated exhaust gas flows through the aftertreatment device.

In various embodiments, the system includes an additional aftertreatment device of the exhaust system downstream from the aftertreatment device that is configured to further treat the exhaust gas of the primary exhaust gas stream, wherein the second position in the exhaust system is upstream from the additional aftertreatment device.

In various embodiments, the engine is a gasoline or diesel engine, and the fuel is gasoline or diesel.

In various embodiments, the aftertreatment device comprises a catalytic converter.

A vehicle is provided. In one embodiment, the vehicle includes an engine configured to consume fuel and air and thereby generate exhaust gas, an exhaust system configured to channel the exhaust gas within a primary exhaust gas stream from the engine to an outlet for emissions, an aftertreatment device in the exhaust system, an exhaust recirculation system configured to selectively divert at least some of the exhaust gas within the primary exhaust gas stream as recirculated exhaust gas from a first position in the exhaust system downstream of the aftertreatment device, through a cavity defined between interior surfaces of a housing that encloses the aftertreatment device and exterior surfaces of the aftertreatment device such that at least some of the recirculated exhaust gas within the secondary exhaust gas stream contacts the exterior surfaces of the aftertreatment device, and from the housing to a second position in the exhaust system upstream of the aftertreatment device, wherein the recirculated exhaust gas defines a secondary exhaust gas stream within the exhaust recirculation system, wherein the recirculated exhaust gas within the secondary exhaust gas stream is combined with the exhaust gas within the primary exhaust gas stream at the second position; and a controller configured to, by a processor, selectively operate the exhaust recirculation system to perform an exhaust gas recirculation process that includes controlling the exhaust recirculation system to divert the exhaust gas from the primary exhaust gas stream to the secondary exhaust gas stream and thereby cause the recirculated exhaust gas within the secondary exhaust gas stream to be treated with the aftertreatment device more than once, wherein, during the exhaust gas recirculation process, the exhaust recirculation system is configured to transfer heat by convection from the recirculated exhaust gas to the exterior surfaces of the aftertreatment device as the recirculated exhaust gas flows through the cavity of the housing, and to interior surfaces of the aftertreatment device as the recirculated exhaust gas flows through the aftertreatment device.

In various embodiments, the controller is configured to, by the processor: sense a temperature of the exhaust gas and/or a catalyst of the aftertreatment device or simulate the temperature of the exhaust gas and/or the catalyst of the aftertreatment device based on operating conditions of the engine and/or exhaust system, sense a flow rate of the exhaust gas or simulate the flow rate of the exhaust gas based on the operating conditions of the engine and/or exhaust system initiate the exhaust gas recirculation process in response to the sensed or simulated temperature of the exhaust gas and/or the catalyst being below a predetermined threshold at the sensed or simulated flow rate, selectively control, with the processor, a volume and/or a pressure of the recirculated exhaust gas within the secondary exhaust gas stream based on the sensed or simulated temperature of the exhaust gas and/or the catalyst and the sensed or simulated flow rate prior to the sensed or simulated temperature of the exhaust gas and/or catalyst being equal to or above the predetermined threshold at the sensed or simulated flow rate, wherein controlling the volume and/or pressure of the recirculated exhaust gas includes controlling a position of an exhaust valve configured to selectively divert the exhaust gas from the primary exhaust gas stream to the secondary exhaust gas stream and controlling an operating speed of a recirculation pump configured to pump at least some of the exhaust gas from the primary exhaust gas stream through the secondary exhaust gas stream, and end performance of the exhaust gas recirculation process after the sensed or simulated temperature of the exhaust gas and/or catalyst is equal to or above the predetermined threshold at the sensed or simulated flow rate.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Figure 1:
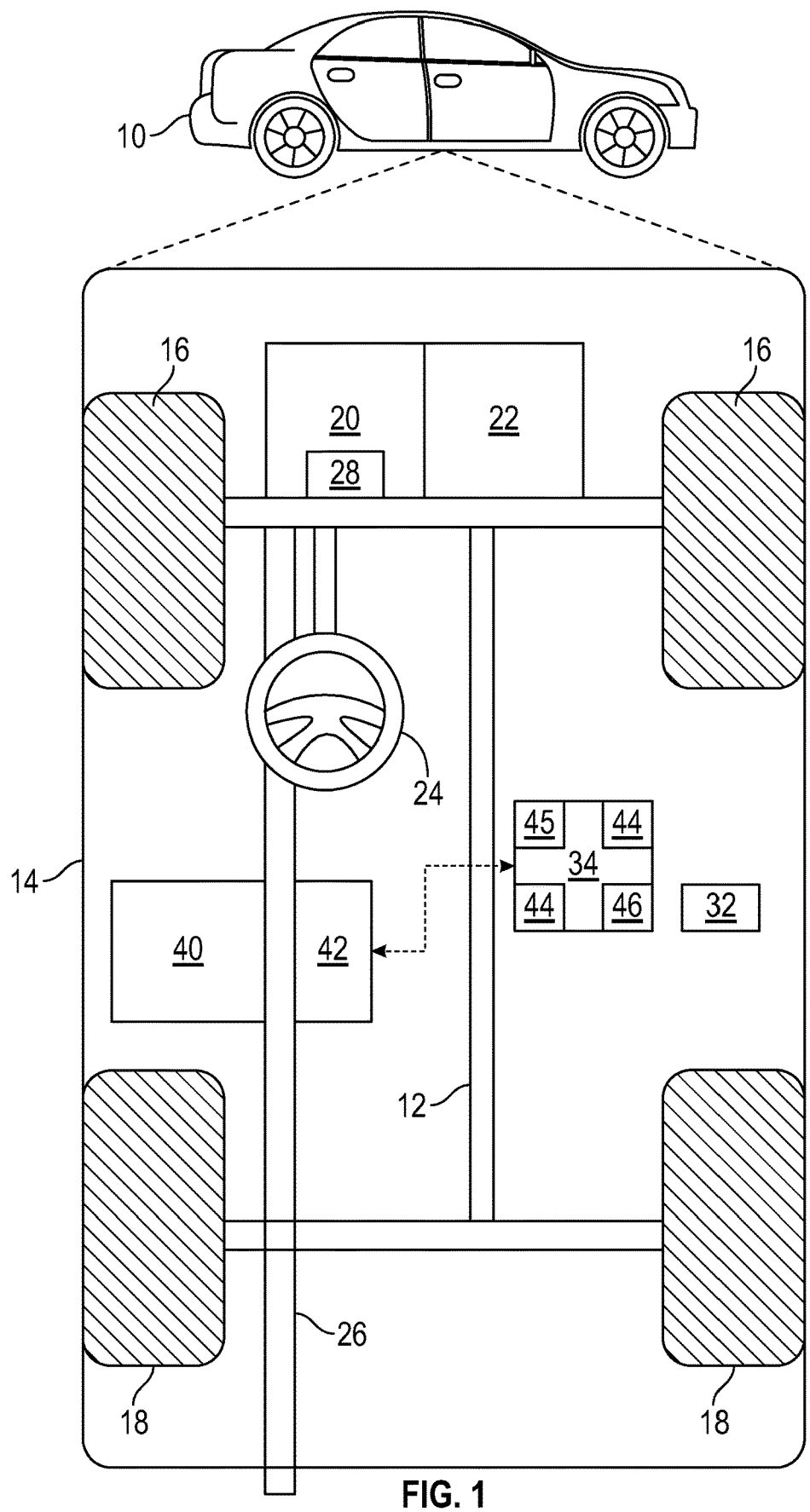
FIG. 1 is a functional block diagram of a vehicle that includes an engine system, an exhaust system, and an emissions control system in accordance with an embodiment.

FIG. 1 illustrates a vehicle 10, according to an exemplary embodiment. In certain embodiments, the vehicle 10 comprises an automobile. In various embodiments, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 10 may also comprise a motorcycle and/or one or more other types of vehicles. In addition, in various embodiments, it will also be appreciated that the vehicle 10 may comprise any number of other types of mobile platforms.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

The vehicle 10 further includes a propulsion system 20, a transmission system 22, a steering system 24, an exhaust system 26, at least one data storage device 32, at least one controller 34, and an emissions control system 40. The propulsion system 20 includes an internal combustion engine 28, such as a gasoline or diesel fueled combustion engine. The transmission system 22 is configured to transmit power from the propulsion system 20 to the wheels 16, 18 according to selectable speed ratios. According to various embodiments, the transmission system 22 may include a step-ratio automatic transmission, a continuously variable transmission, or other appropriate transmission. The steering system 24 influences a position of the wheels 16-18. While depicted as including a steering wheel for illustrative purposes, in some embodiments contemplated within the scope of the present disclosure, the steering system 24 may not include a steering wheel.

The data storage device 32 stores data for use in controlling the vehicle 10 and/or systems and components thereof. As can be appreciated, the data storage device 32 may be part of the controller 34, separate from the controller 34, or part of the controller 34 and part of a separate system. The data storage device 32 can be any suitable type of storage apparatus, including various types of direct access storage and/or other memory devices. In one exemplary embodiment, the data storage device 32 comprises a program product from which a computer readable memory device can receive a program that executes one or more embodiments of one or more processes of the present disclosure, such as the steps of the process discussed further below in connection with FIG. 6. In another exemplary embodiment, the program product may be directly stored in and/or otherwise accessed by the memory device and/or one or more other disks and/or other memory devices.

The controller 34 includes at least one processor 44, a communication bus 45, and a computer readable storage device or media 46. The processor 44 performs the computation and control functions of the controller 34. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. The bus 45 serves to transmit programs, data, status and other information or signals between the various components of the vehicle 10. The bus 45 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 44, receive and process signals from the sensor system, perform logic, calculations, methods and/or algorithms, and generate data based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate data.

As can be appreciated, that the controller 34 may otherwise differ from the embodiment depicted in FIG. 1. For example, the controller 34 may be coupled to or may otherwise utilize one or more remote computer systems and/or other control systems, for example as part of one or more of the above-identified vehicle devices and systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

The engine 28 may be naturally aspirated as illustrated, or in other embodiments may include a turbocharger or supercharger to pump air into the engine 28 for combustion purposes. The vehicle 10 includes an exhaust system 26 for conveying exhaust gases from combustion chambers of the engine 28 to a tailpipe section for discharge to the atmosphere. One or more pipe sections may couple the engine 28, such as from exhaust manifolds of the engine 28, to aftertreatment devices of an emissions control system 40.

The emissions control system 40 may include various aftertreatment devices for reducing the emissions from the engine 28. In various embodiments, the emissions control system 40 includes one or more catalytic converter(s). The catalytic converter(s) may be two-way, or three-way type. When configured as a two-way type, the catalytic converter(s) convert two components in the exhaust gas stream, including carbon monoxide (CO) and hydrocarbons (HC), to other constituents. When configured as a three-way type, the catalytic converter(s) convert three components in the gas stream to other elements or compounds including converting carbon monoxide (CO), hydrocarbons (HC), and nitrogen oxides ($NO_x$) to innocuous elements or compounds (e.g., carbon dioxide ($CO_2$), nitrogen ($N_2$), and water ($H_2O$)). The catalytic converter(s) may contain catalysts such as platinum, palladium, or other materials.

In various embodiments in which the engine 28 is diesel fueled combustion engine, the emissions control system 40 may include various aftertreatment devices such as a diesel oxidation catalyst (DOC), a diesel particulate filter (DPF), a urea dosing system, a decomposition reactor, an exhaust mixer, selective catalytic reduction (SCR) system, and/or an ammonia slip catalyst (ASC) system.

In various embodiments, the emissions control system 40 includes an exhaust recirculation system 42 that is configured to recirculate at least some of the exhaust gases in the exhaust system 26 such that the recirculated exhaust gases are treated with one or more of the aftertreatment devices of the emissions control system 40 more than once. For example, the exhaust recirculation system 42 may be configured to channel a volume of the exhaust gases downstream of a catalytic converter to a location in the exhaust system 26 upstream of the catalytic converter such that the recirculated volume of the exhaust gases reenters the catalytic converter and is treated thereby again.

In addition to treating the recirculated volume of exhaust gas one or more additional times, recirculation of the exhaust gas via the exhaust recirculation system 42 promotes quick and uniform heating of a catalyst of the aftertreatment device and/or other devices downstream of the exhaust recirculation system 42 which in turn may promote catalyst conversion efficiency. This can be particularly beneficial in reducing time periods wherein the engine 28 is operating under cold-start and/or low load conditions. For example, exhaust gas is heated during passage through the aftertreatment device due to reactions with the catalyst therein. As such, the exhaust gas that is recirculated is capable of providing such heat back into the aftertreatment device upon subsequently passing therethrough. In addition, heat may be added to the exhaust gas via an increase in exhaust back pressures and temperatures causing an increase in engine requirements for torque during idling and partial loads. In some embodiments, the exhaust gas may be transported with a recirculation pump, discussed hereinafter, which may add pumping work to the exhaust gas and thereby add energy thereto. In some embodiments, the recirculation pump may be operated to inject air into the primary exhaust gas stream to reduce carbon monoxide and/or hydrocarbon emissions at high temperature enrichment operation conditions without the necessity of a turbocharger or supercharger.

Figure 2:
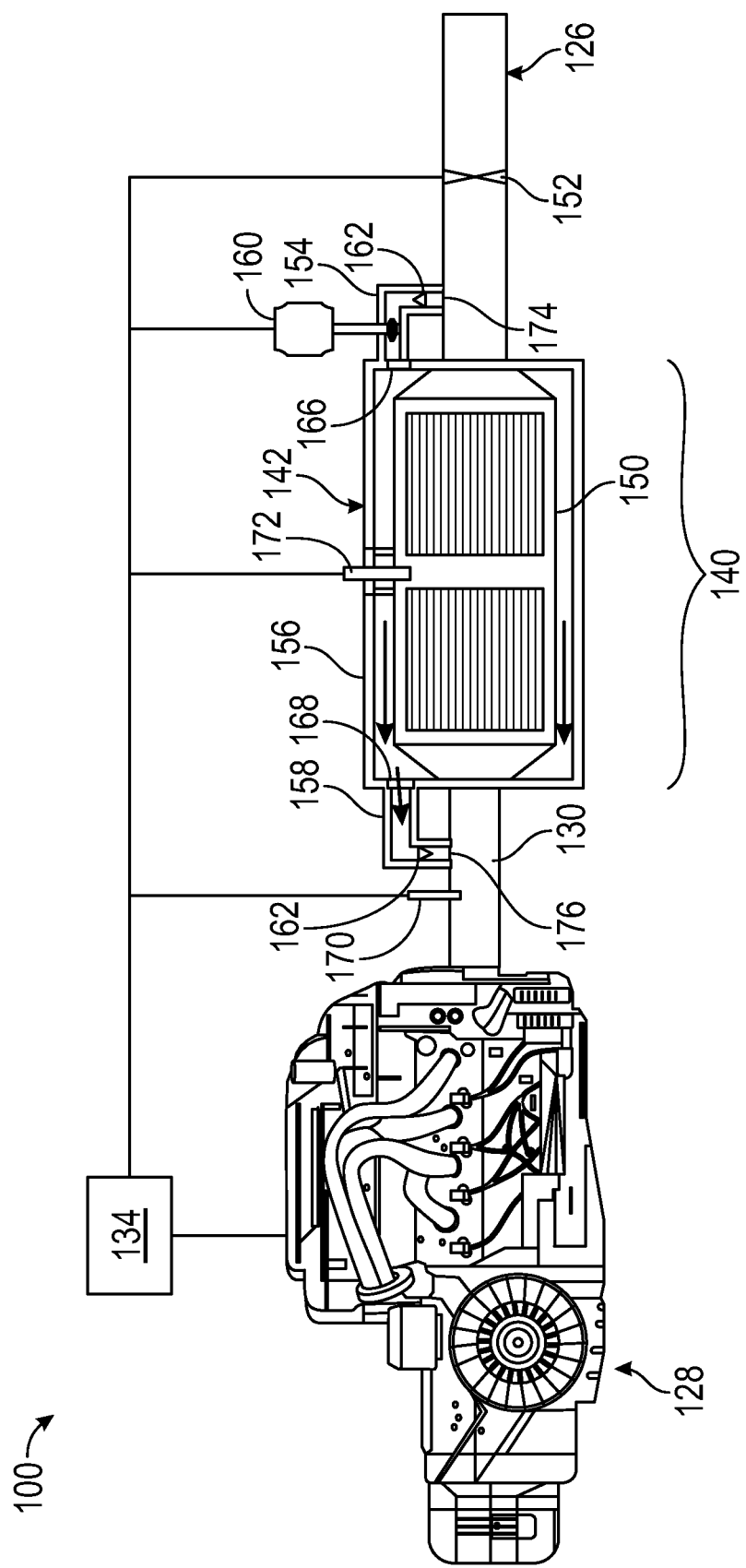
FIG. 2 is a diagram of a first embodiment of the emissions control system of FIG. 1.
Figure 3:
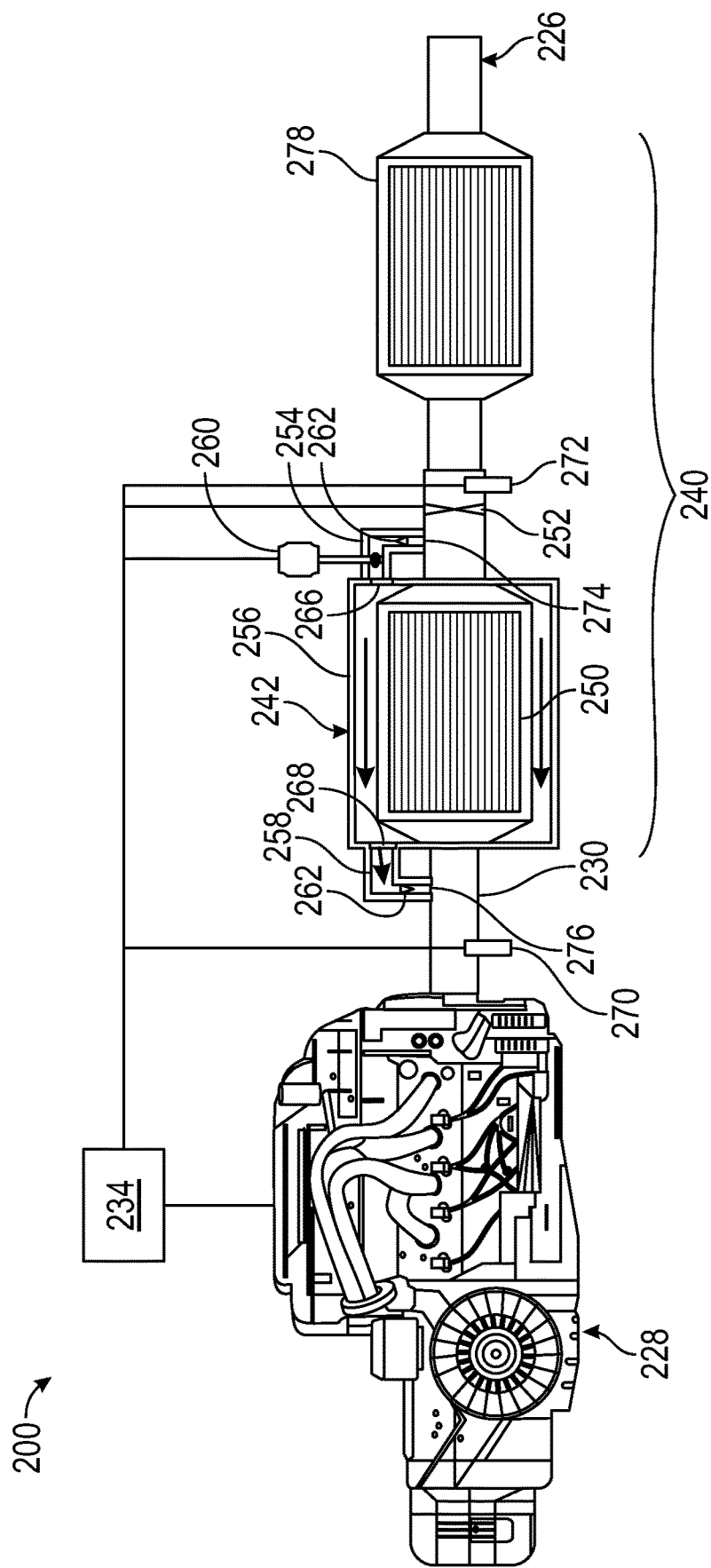
FIG. 3 is a diagram of a second embodiment of the emissions control system of FIG. 1.
Figure 4:
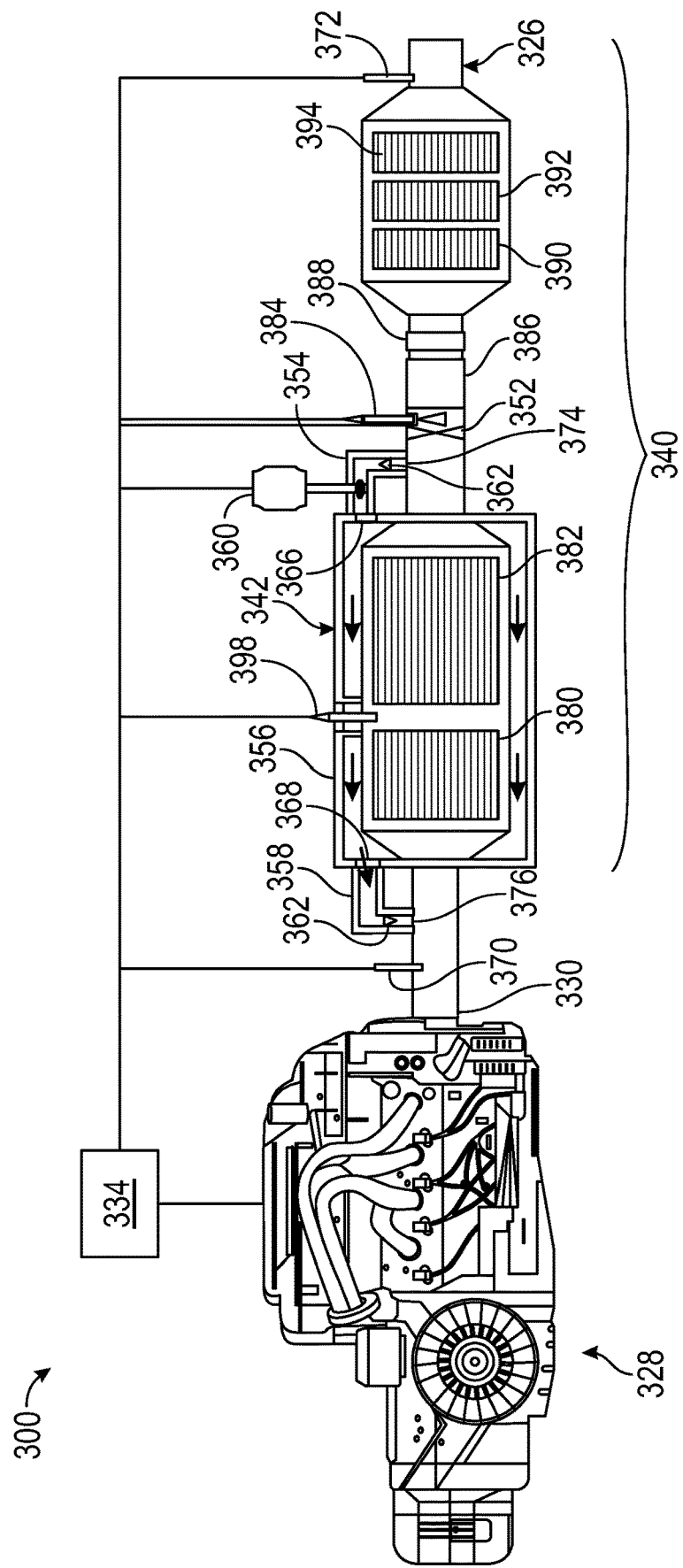
FIG. 4 is a diagram of a third embodiment of the emissions control system of FIG. 1.

FIGS. 2-4 illustrate various nonlimiting examples of systems 100,200,300 of types suitable for use in the vehicle 10, such as for certain components of the propulsion system 20, the exhaust system 26, the emissions control system 40, and/or the exhaust recirculation system 42 of FIG. 1. It should be noted that these examples are merely for illustrative purposes and the propulsion system 20, the exhaust system 26, the emissions control system 40, and/or the exhaust recirculation system 42 of FIG. 1 may have other configurations, including various combinations of the components represented in FIGS. 2-4.

For convenience, consistent reference numbers are used throughout FIGS. 2-4 to identify the same or functionally related/equivalent elements, but with a numerical prefix (1, 2, or 3, etc.) added to distinguish the particular embodiment from other embodiments of the of the figures. In view of similarities between the embodiments, the following discussion of FIGS. 2-4 will focus primarily on aspects of the embodiments that differ from the other embodiments in some notable or significant manner. Other aspects of the embodiments not discussed in any detail can be, in terms of structure, function, materials, etc., essentially as was described for one or more of the other embodiments, including the embodiment of FIG. 1.

In FIGS. 2-4, an engine 128/228/328 is configured to consume fuel and air and thereby generate an exhaust gas, an exhaust pipe 130/230/330 is configured to channel the exhaust gas within a primary exhaust gas stream from the engine 128/228/328 to an outlet (e.g., a tailpipe section) for emissions, one or more aftertreatment devices are provided to perform various emissions control treatments on the exhaust gas of the primary exhaust gas stream, and an exhaust recirculation system 142/242/342 is provided to channel at least some of the exhaust gases in the primary exhaust gas steam from a first location at a recirculation inlet 174/274/374 along the exhaust pipe 130/230/330 downstream of one or more of the aftertreatment devices to a second location at a recirculation outlet 176/276/376 upstream of the one or more aftertreatment devices. The volume of exhaust gases channeled from the primary exhaust gas stream through the exhaust recirculation system 142/242/342 is referred to herein as the recirculated exhaust gas which, while within the exhaust recirculation system 142/242/342, defines a secondary exhaust gas stream. Once the recirculated exhaust within the secondary exhaust gas stream reaches the recirculation outlet 176/276/376, the recirculated exhaust gas of the secondary exhaust gas stream reenters the primary exhaust gas stream and combine with the exhaust gases therein of the primary exhaust gas stream. As such, the volume of recirculated exhaust gas channeled through the secondary exhaust gas stream may be treated by the one or more aftertreatment devices again. A controller 134/234/334 is functionally in communication with various components of the systems 100/200/300 to monitor, measure, and/or control various operating parameters of such components.

Referring now to FIG. 2, the system 100 includes a three-way type of catalytic converter 150 fluidically coupled in-line with the exhaust pipe 130 and configured to receive the exhaust gas of the primary exhaust gas stream from a first section thereof. As the primary exhaust gas stream passes through the catalytic converter 150, the exhaust gas thereof is treated to convert carbon monoxide (CO), hydrocarbons (HC), and oxides of nitrogen (NO$_x$) to other constituents. Thereafter, the primary exhaust gas stream continues through a second section of the exhaust pipe 130 to the outlet for emissions.

The exhaust recirculation system 142 of the system 100 includes a recirculation inlet pipe 154, a recirculation housing 156, and a recirculation outlet pipe 158. The recirculation inlet pipe 154 is fluidically coupled to the second section of the exhaust pipe 130 at the recirculation inlet 174 and to the recirculation housing 156 at a housing inlet 166. The recirculation outlet pipe 158 is fluidically coupled to the recirculation housing 156 at a housing outlet 168 and to the first section of the exhaust pipe 130 at the recirculation outlet 176. The recirculation housing 156 fluidically encloses an entirety of the catalytic converter 150 between the housing inlet 166 and the housing outlet 168. A space or cavity is provided between interior surfaces of the recirculation housing 156 and exterior surfaces of the catalytic converter 150 such that the secondary exhaust gas stream is capable of flowing therebetween.

With this arrangement, the exhaust recirculation system 142 of the system 100 is configured to channel the recirculated exhaust gas within the secondary exhaust gas stream from the recirculation inlet 174 to the cavity defined between the interior surfaces of the recirculation housing 156 and the exterior surfaces of the catalytic converter 150 such that at least some of the recirculated exhaust gas within the secondary exhaust gas stream contact the exterior surfaces of the catalytic converter 150, and to subsequently channel the secondary exhaust gas stream from the cavity to the recirculation outlet 176 in the exhaust system 126. In addition to the recirculated exhaust gas within the secondary exhaust gas stream being treated again by the catalytic converter 150, this recirculated exhaust gas provides an additional function of providing heat via convection (convective heat transfer) to the exterior surfaces of the catalytic converter 150 upon contact therewith while passing through the cavity of the recirculation housing 156 as well as to interior surfaces of the catalytic converter 150 upon reentering the catalytic converter 150 subsequent to exiting the recirculation outlet 176. This can promote rapid and uniform heating of a catalyst of the aftertreatment device. In some embodiments such as those represented in FIGS. 2-5, the recirculation inlet pipe 154 is coupled to the exhaust pipe 130 such that flow into the exhaust recirculation system 142 is substantially perpendicular to the flow through the exhaust pipe 130 and/or in a direction opposite of gravity. Such arrangement may promote mixing and conversion efficiency of the exhaust gas.

In order to divert a volume of the exhaust gas from the primary exhaust gas stream into the recirculation inlet 174, the controller 134 may, by a processor 144, selectively control an exhaust valve 152 to increase and/or reduce the flow of the exhaust gas of the primary exhaust gas stream through the second section of the exhaust pipe 130 at a location downstream of the recirculation inlet 174. That is, the exhaust valve 152 may be completely closed to impede passage of the exhaust gas therethrough, completely opened to allow passage of the exhaust gas therethrough, or adjusted to a position between completely opened and completely closed (i.e., partially open/closed) to selectively control a volume of the exhaust gas passing through the exhaust valve 152. A reduction in the volume of the exhaust gas passing through the exhaust valve 152 may result in an increase of gas pressure within the exhaust pipe 130 and thereby divert at least some of the exhaust gas into the recirculation inlet 174. Check valves 162,164 may be located in the recirculation inlet pipe 154 and the recirculation outlet pipe 158, respectively, to provide further control over a volume and/or pressure and timing of the recirculated exhaust gas passing through the exhaust recirculation system 142. In some embodiments, the check valves 162,164 may allow the exhaust gas to return to the primary exhaust gas stream upon the secondary exhaust gas stream reaching a predetermined pressure (e.g., about 150 kPa). In addition, the controller 134, by the processor 144, may operate a recirculation pump 160 to pump exhaust gas through the exhaust recirculation system 142. In various embodiments, operation of the recirculation pump 160 causes energy to be transferred from the recirculation pump 160 to the recirculated exhaust gas. For example, dynamic operation of the exhaust valve 152 (e.g., closing at varying percentages at varying engine speeds and loads) and/or the recirculation pump 160 may add pumping work to the recirculated exhaust gas resulting in an increase in back pressure and/or temperature of the recirculation exhaust gas. In addition, the dynamic operation of the exhaust valve 152 and the recirculation pump 160 may increase torque requirements of the engine 128 during idling and partial load conditions, which in turn may increase temperatures of the exhaust gas and, therefore, catalytic conversion efficiency.

In various embodiments, the system 100 may include a first oxygen ($O_2$) sensor 170 configured to sense a concentration of oxygen ($O_2$) in the primary exhaust gas stream (upstream of the recirculation outlet 176) and a second oxygen ($O_2$) sensor 172 configured to sense a concentration of oxygen ($O_2$) at a location downstream of the catalytic converter 150. The first and second oxygen sensors 170,172 are configured to transmit the sensed concentrations to the controller 134, and the controller 134 is configured to monitoring the concentrations, analyze and/or compare the concentrations of oxygen prior to and subsequent to the exhaust recirculation system 142, and selectively control a close loop fuel control to promote stochiometric conditions during operation of the engine (e.g., for gasoline applications) based on the sensed concentrations of oxygen. Notably, the locations of the first and second oxygen sensors 170,172 are exemplary and may be positioned elsewhere within the exhaust system 126 and/or exhaust recirculation system 142. The exhaust recirculation system 142 may promote efficiency of the close loop fuel control by promoting uniformity of the exhaust species' concentration in the exhaust gas and by promoting rapid warming of the catalytic converter 150.

In various embodiments, the exhaust recirculation system 142 may be operated while the exhaust gas and components of the system 100 in contact therewith are below a predetermined temperature, for example, during cold-start conditions. For example, the controller 134 may begin diverting the exhaust gas into the exhaust recirculation system 142 upon initiation of the engine 128 and cease diverting exhaust gas into the exhaust recirculation system 142 after a predetermined period of time. In addition, or as an alternative, the controller 134 may sense a temperature of the exhaust gas, a catalyst of the catalytic converter 150, and/or a coolant of the engine 140, or simulate the temperature of the exhaust gas, the catalyst, or the coolant based on operating conditions of the engine 128 and/or exhaust system 126. In addition, the controller 134 may sense a flow rate of the exhaust gas or simulate the flow rate of the exhaust gas based on operating conditions of the engine 128 and/or the exhaust system 126. The controller 134 may begin diverting the exhaust gas into the exhaust recirculation system 142 in response to the sensed or simulated temperature of the exhaust gas and/or the catalyst being below a predetermined threshold at the sensed or simulated flow rate, and cease diverting exhaust gas into the exhaust recirculation system 142 after the sensed or simulated temperature of the exhaust gas and/or catalyst is equal to or above the predetermined threshold at the sensed or simulated flow rate. In various embodiments, the predetermined temperature for the catalyst may be about 300° C. and/or the predetermined temperature for the coolant may be about 60° C. For embodiments in which the temperature of the exhaust gas, the catalyst, and/or the coolant are simulated and/or the flow rate of the exhaust gas is simulated, such simulations may be based various operating conditions of the engine 128 such as but not limited to engine speed, engine torque, and values of the oxygen sensors 170,172.

In some embodiments, the controller 134 is configured to selectively control, with the processor 144, a volume and/or a pressure of the recirculated exhaust gas within the secondary exhaust gas stream based on the sensed or simulated temperature of the exhaust gas and/or the catalyst and the sensed or simulated flow rate of the exhaust gas prior to the sensed or simulated temperature of the exhaust gas and/or catalyst being equal to or above the predetermined threshold at the sensed or simulated flow rate. In some embodiments, controlling the volume and/or pressure of the recirculated exhaust gas includes controlling a position of the exhaust valve 152 to divert the exhaust gas from the primary exhaust gas stream to the secondary exhaust gas stream and controlling an operating speed of the recirculation pump 160 to pump at least some of the exhaust gas from the primary exhaust gas stream through the secondary exhaust gas stream.

Referring now to FIG. 3, the system 200 includes a first catalytic converter 250 fluidically coupled in-line with the exhaust pipe 230 and configured to receive the exhaust gas of the primary exhaust gas stream from a first section thereof. As the primary exhaust gas stream passes through the first catalytic converter 250, the exhaust gas thereof is treated to convert carbon monoxide (CO), hydrocarbons (HC), and oxides of nitrogen ($NO_x$) to other constituents. Upon exiting the first catalytic converter 250, the exhaust gas is channeled through a second section of the exhaust pipe 230 to a second catalytic converter 278 wherein the exhaust gas is again treated to convert additional carbon monoxide (CO), hydrocarbons (HC), and oxides of nitrogen ($NO_x$) therein to other constituents. Thereafter, the primary exhaust gas stream continues through a third section of the exhaust pipe 230 to the outlet for emissions.

The exhaust recirculation system 242 of the system 200 is substantially the same as the previously discussed exhaust recirculation system 142 of the system 100 of FIG. 2. Notably, the recirculation housing 256 encloses only the first catalytic converter 250, and the exhaust recirculation system 242 recirculates exhaust gas from positions along the exhaust pipe 230 upstream of the first catalytic converter 250 (and the recirculation outlet 276) and downstream of the first catalytic converter 250 (and upstream of the second catalytic converter 278). In addition, the second oxygen sensor 272 is positioned in the second section of the exhaust pipe 230 downstream of the exhaust valve 252.

Other than the above noted differences, the system 200 is structured, functions, and operates in substantially the same manner as described above in reference to the system 100 of FIG. 2. The embodiment of FIG. 3 provides for efficient warming of the first catalytic converter 250 while operating the second catalytic converter 278 normally without exhaust gas recirculation.

Referring now to FIG. 4, the engine 328 is configured to consume diesel fuel. Therefore, the system 300 includes a diesel oxidation catalyst (DOC) 380 and a diesel particulate filter (DPF) 382 that are fluidically coupled in-line with the exhaust pipe 330 and configured to receive the exhaust gas of the primary exhaust gas stream from a first section thereof. As the primary exhaust gas stream passes through the DOC 380, the exhaust gas thereof is treated to convert carbon monoxide (CO) and hydrocarbons (HC) to other constituents. In addition, long-chain hydrocarbons and nitrogen oxide (NO) in the exhaust gas are oxidized. Within the DPF 382, carbon is collected and oxidized to remove particulate matter (PM) from the exhaust gas.

Upon exiting the DPF 382, the exhaust gas is channeled through a second section of the exhaust pipe 330 past a urea dosing system 384, through a decomposition reactor 386, through a swirl vane mixer 388, and into various catalytic converters including a first selective catalytic reduction (SCR) 390, a second SCR 392, and an ammonia slip catalyst (ASC) 394. The urea dosing system 384 injects a urea (e.g., diesel exhaust fluid (DEF)) into the exhaust gas and, in combination with the decomposition reactor 386, causes a urea decomposition reaction in the exhaust gas to produce therefrom ammonia ($NH_3$) via hydrolysis. The swirl vane mixer 388 mixes the exhaust gas with the urea to promote efficiency of the reaction. In some embodiments, the exhaust recirculation system 342 is operated prior to initiation of the urea dosing system 384. In some embodiments, operation of the exhaust recirculation system 342 is ceased at a predetermined period of time after the urea dosing system 384 has been initiated.

In the presence of an SCR catalyst within the first and second SCRs 390,392, the ammonia ($NH_3$) reacts selectively with the nitrogen oxides ($NO_x$) in the exhaust gas to form nitrogen ($N_2$) and water ($H_2O$). Within the ASC 394, excess ammonia is oxidized. Thereafter, the primary exhaust gas stream continues through a third section of the exhaust pipe 330 to the outlet for emissions.

In this example, the exhaust recirculation system 342 of the system 300 encloses the DOC 380 and the DPF 382, and the exhaust recirculation system 342 recirculates exhaust gas from positions along the exhaust pipe 330 upstream of the DOC 380 (and the recirculation outlet 376) and downstream of the DPF 382 (and upstream of the urea dosing system 384).

Rather than the oxygen ($O_2$) sensors 170/172/270/272 of the previous examples, the system 300 includes a first nitrogen oxides ($NO_x$) sensor 370 configured to sense a concentration of nitrogen oxides ($NO_x$) in the primary exhaust gas stream (upstream of the recirculation outlet 376) and a second nitrogen oxides ($NO_x$) 372 configured to sense a concentration of nitrogen oxides ($NO_x$) in the primary exhaust gas stream downstream of the ASC 394.

The first and second nitrogen oxides sensors 370,372 are configured to transmit the sensed concentrations to the controller 334, and the controller 334 is configured to monitoring the concentrations, analyze and/or compare the concentrations to determine concentrations of nitrogen oxides in the exhaust system. The controller 334 may selectively control urea dosing based on the determined concentrations of nitrogen oxides.

The system 300 may include a pressure sensor 398 configured to measure a change in pressure (AP) between the DPF 382 and an exhaust backpressure upstream of the DPF 382. The pressure sensor 398 is configured to transmit the sensed pressures or measured change in pressure to the controller 334.

Other aspects of the system 300 may be structured, function, and operate in substantially the same manner as described above in reference to the system 100 of FIG. 2 and the system 200 of FIG. 3. The embodiment of FIG. 4 may promote rapid warming of the DOC 380, the DPF 382, and the first and second SCRs 390,392 to promote efficient catalyst conversion and achieve earlier urea dosing to reduce emissions. Notably, the exhaust recirculation system 342 may be configured to recirculate exhaust gas across the DOC 380 and the DPF 382 as represented, or may alternatively be configured to recirculate exhaust gas across an entirety of the exhaust system. For example, the recirculation inlet 374 may be coupled to the exhaust pipe 330 downstream of the ASC 394.

Figure 5:
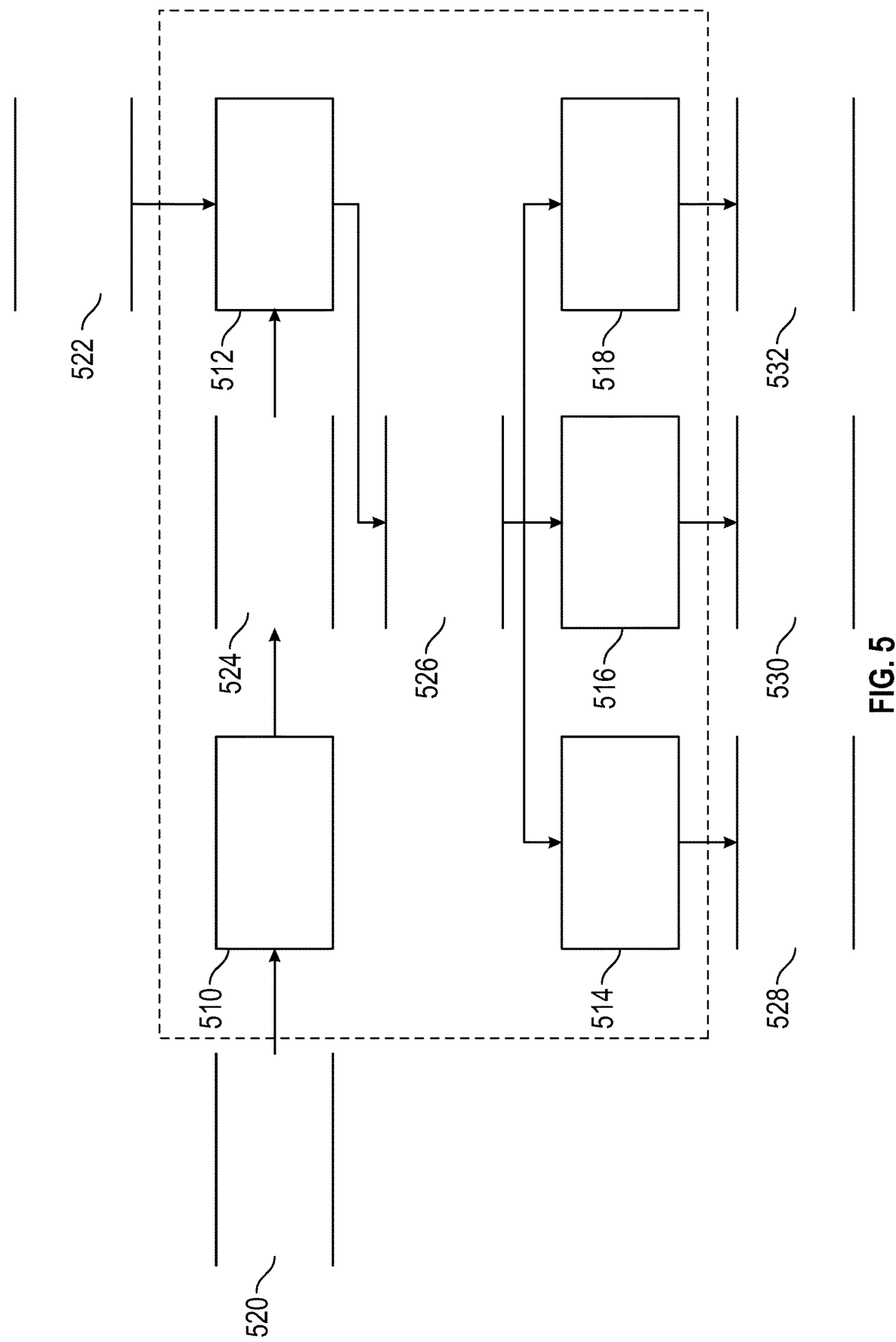
FIG. 5 is a dataflow diagram illustrating elements of the emissions control system of the vehicle of FIG. 1, in accordance with various embodiments.

With reference to FIG. 5 and with continued reference to FIGS. 1-4, a dataflow diagram illustrates elements of the emissions control system 40 of FIG. 1 in accordance with various embodiments. As can be appreciated, various embodiments of the emissions control system 40 according to the present disclosure may include any number of modules embedded within the controller 34/134/234/334 which may be combined and/or further partitioned to similarly implement systems and methods described herein. Furthermore, inputs to the emissions control system 40 may be received from other control modules (not shown) associated with the vehicle 10, and/or determined/modeled by other sub-modules (not shown) within the controller 34/134/234/334. Furthermore, the inputs might also be subjected to preprocessing, such as sub-sampling, noise-reduction, normalization, feature-extraction, missing data reduction, and the like. In various embodiments, the emissions control system 40 includes a temperature analysis module 510, an exhaust recirculation module 512, an engine control module 514, and exhaust valve control module 516, and a recirculation pump control module 518.

In various embodiments, the temperature analysis module 510 receives as input sensor data 520 generated by, for example, the temperature sensors and/or thermocouples or a temperature simulation model. The sensor data 520 includes various data indicating sensed or simulated temperatures of the exhaust gas, a catalyst of an aftertreatment device, and/or a coolant.

The temperature analysis module 510 performs an analysis or comparison of the sensed or simulated temperatures of the received sensor data 520 to determine whether one or more of the temperatures are below a predetermined threshold.

In various embodiments, the exhaust recirculation module 512 receives as input engine operation data 522 generated by one or more sensors associated with the engine 28/128/228/328 and temperature data 524 generated by the temperature analysis module 510. The engine operation data 522 includes various data indicating operating statuses of the engine 28/128/228/328 and the temperature data 524 includes various data indicating a determination as to whether the temperatures of the exhaust gas, catalyst, and/or coolant are below the predetermined threshold as determined by the temperature analysis module 510.

The exhaust recirculation module 512 performs an analysis of the engine operation data 522 and/or the temperature data 524 to determine operating parameters of the exhaust recirculation system 142/242/342 and/or the engine 28/128/228/328, (e.g., engine torque, exhaust flow, catalyst temperature, concentration changes, pressure changes, etc.).

In various embodiments, the engine control module 514, exhaust valve control module 516, and the recirculation pump control module 518 each receive as input exhaust recirculation data 526 generated by the exhaust recirculation module 512. The exhaust recirculation data 526 includes various data indicating desired operating parameters as determined by the exhaust recirculation module 512.

The engine control module 514, exhaust valve control module 516, and the recirculation pump control module 518 generate engine control data 528, exhaust valve control data 530, and recirculation pump control data 532, respectively, based on the exhaust recirculation data 526. The engine control data 528, exhaust valve control data 530, and recirculation pump control data 532 include instructions for the engine 28/128/228/328, the exhaust valve 152/252/352, and the recirculation pump 160/260/360, respectively, configured to control these components in accordance with the desired operating parameters indicated in the exhaust recirculation data 526.

Figure 6:
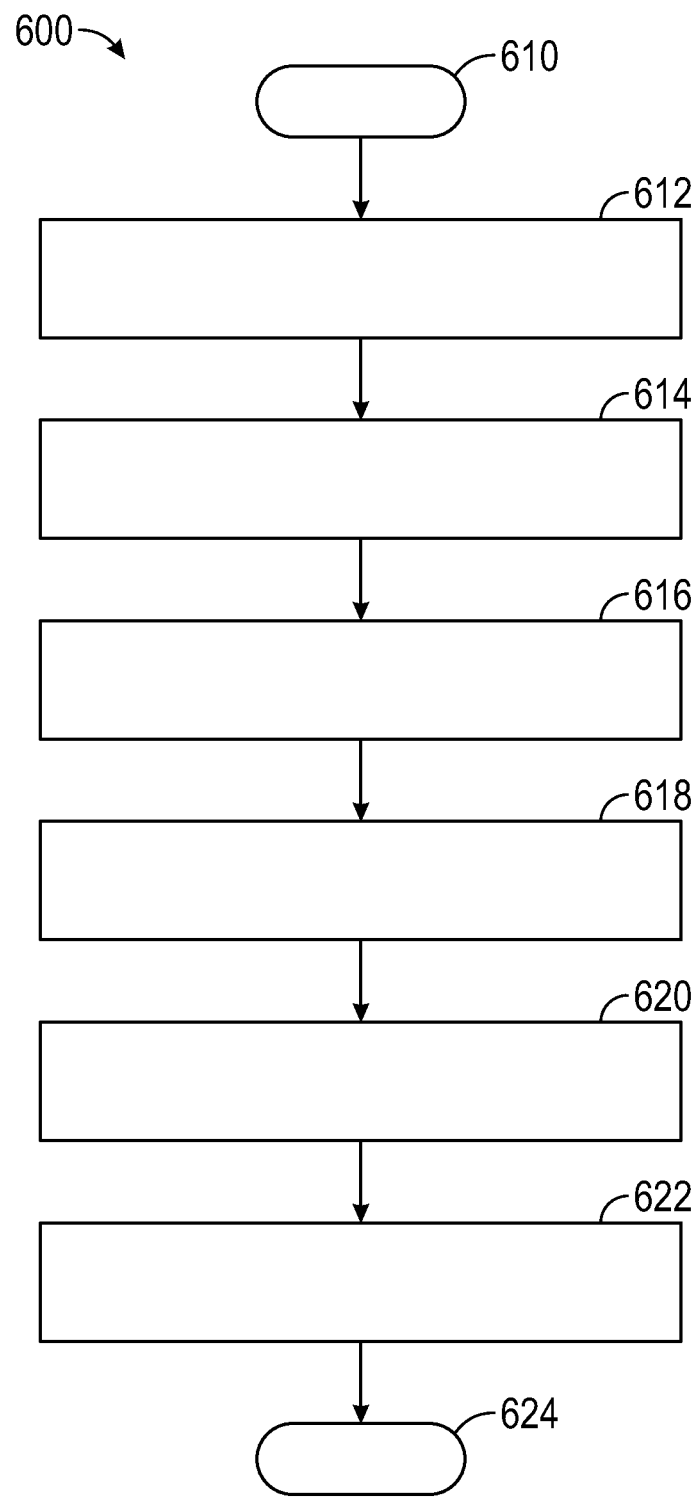
FIG. 6 is flowchart of a process for promoting emissions control as performed by the emissions control system of the vehicle of FIG. 1, in accordance with various embodiments.

With reference now to FIG. 6 and with continued reference to FIGS. 1-5, a flowchart provides a method 600 for operating the exhaust recirculation system 142/242/342 as performed by the exhaust system 26/126/226/326, in accordance with exemplary embodiments. As can be appreciated in light of the disclosure, the order of operation within the method 600 is not limited to the sequential execution as illustrated in FIG. 6, but may be performed in one or more varying orders as applicable and in accordance with the present disclosure. In various embodiments, the method 600 can be scheduled to run based on one or more predetermined events, and/or can run continuously during operation of the vehicle 10.

In one example, the method 600 may begin at 610 and initiate operation of the engine 28/128/228/328 at 612 to consume fuel and air and thereby generate a primary exhaust gas stream. The primary exhaust gas steam is channeled through the exhaust system 26/126/226/326 at 614 from the engine 28/128/228/328 to the outlet for emissions. A first treatment is performed on the primary exhaust gas stream at 616 with the aftertreatment device 150/250/380/382 of the exhaust system 26/126/226/326. An exhaust gas recirculation process is initiated and performed at 618 that includes diverting at least some of the exhaust gas within the primary exhaust gas stream from a first position in the exhaust system 26/126/226/326 downstream of the aftertreatment device 150/250/380/382 to a second position in the exhaust system 26/126/226/326 upstream of the aftertreatment device 150/250/380/382, wherein the diverted volume of exhaust gas of the primary exhaust gas stream defines a secondary exhaust gas stream, wherein the exhaust gas of the secondary exhaust gas stream is combined with the exhaust gas of the primary exhaust gas stream at the second location. A second treatment is performed on the exhaust gas that passed through secondary exhaust gas stream at 620 with the aftertreatment device 150/250/380/382. The exhaust gas recirculation process may be ended at 622 and the method 600 may end at 624.

In various embodiments, the method 600 may include ending performance of the exhaust gas recirculation process after the engine 28/128/228/328 has been operating for a predetermined period of time, such as 60 seconds or less. In various embodiments, the method 600 may include sensing a temperature of the exhaust gas and/or a catalyst of the aftertreatment device or simulating the temperature of the exhaust gas and/or the catalyst of the aftertreatment device based on operating conditions of the engine and/or exhaust system, sensing a flow rate of the exhaust gas or simulating the flow rate based on operating conditions of the engine and/or the exhaust system, initiating the exhaust gas recirculation process in response to the sensed or simulated temperature of the exhaust gas and/or the catalyst being below a predetermined threshold at the sensed or simulated flow rate, and ending performance of the exhaust gas recirculation process after the sensed or simulated temperature of the exhaust gas and/or catalyst is equal to or above the predetermined threshold at the sensed or simulated flow rate. In various embodiments, the method 600 may include selectively controlling, with the processor 44, a volume and/or a pressure of the recirculated exhaust gas within the secondary exhaust gas stream based on the sensed or simulated temperature of the exhaust gas and/or the catalyst and the sensed or simulated flow rate of the exhaust gas prior to the sensed or simulated temperature of the exhaust gas and/or catalyst being equal to or above the predetermined threshold at the sensed or simulated flow rate, wherein controlling the volume and/or pressure of the recirculated exhaust gas includes controlling a position of an exhaust valve configured to selectively divert the exhaust gas from the primary exhaust gas stream to the secondary exhaust gas stream and controlling an operating speed of a recirculation pump configured to pump at least some of the exhaust gas from the primary exhaust gas stream through the secondary exhaust gas stream.

In various embodiments, the method 600 may include providing a housing 156/256/356 that encloses the aftertreatment device 150/250/380/382, directing the secondary exhaust gas stream from the first position in the exhaust system 26/126/226/326 to a cavity defined between interior surfaces of the housing 156/256/356 and exterior surfaces of the aftertreatment device 150/250/380/382 such that the exhaust gas within the secondary exhaust gas stream contacts the exterior surfaces of the aftertreatment device 150/250/380/382, and directing the secondary exhaust gas stream from the cavity to the second position in the exhaust system 26/126/226/326.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
    initiating operation of an engine to consume fuel and air and thereby generate exhaust gas;
    channeling, through an exhaust system, the exhaust gas within a primary exhaust gas stream from the engine to an outlet for emissions;
    performing a first treatment on the exhaust gas within the primary exhaust gas stream with an aftertreatment device of the exhaust system; and
    performing an exhaust gas recirculation process that includes:
        diverting, from a first position in the exhaust system downstream of the aftertreatment device, at least some of the exhaust gas within the primary exhaust gas stream into an exhaust recirculation system as recirculated exhaust gas, wherein the recirculated exhaust gas within the exhaust recirculation system defines a secondary exhaust gas stream;
        channeling the recirculated exhaust gas into a cavity of a housing that encloses the aftertreatment device, the cavity defined between interior surfaces of the housing and exterior surfaces of the aftertreatment device, wherein at least some of the recirculated exhaust gas within the secondary exhaust gas stream contacts the exterior surfaces of the aftertreatment device;
        channeling the recirculated exhaust gas within the secondary exhaust gas stream from the cavity to a second position in the exhaust system upstream of the aftertreatment device, wherein the recirculated exhaust gas of the secondary exhaust gas stream is combined with the exhaust gas of the primary exhaust gas stream at the second position; and performing a second treatment on the recirculated exhaust gas within the primary exhaust gas stream with the aftertreatment device.

2. The method of claim 1, further comprising:

initiating the exhaust gas recirculation process in response to the initiating operation of the engine; and ending performance of the exhaust gas recirculation process after the engine has been operating for a predetermined period of time.

3. The method of claim 1, further comprising:

sensing a temperature of the exhaust gas and/or a catalyst of the aftertreatment device or simulating the temperature of the exhaust gas and/or the catalyst of the aftertreatment device based on operating conditions of the engine and/or the exhaust system;

sensing a flow rate of the exhaust gas or simulating the flow rate of the exhaust gas based on the operating conditions of the engine and/or the exhaust system;

initiating the exhaust gas recirculation process in response to the sensed or simulated temperature of the exhaust gas and/or the catalyst being below a predetermined threshold at the sensed or simulated flow rate; and ending performance of the exhaust gas recirculation process after the sensed or simulated temperature of the exhaust gas and/or the catalyst is equal to or above the predetermined threshold at the sensed or simulated flow rate.

4. The method of claim 3, further comprising:

selectively controlling, a volume and/or a pressure of the recirculated exhaust gas within the secondary exhaust gas stream based on the sensed or simulated temperature of the exhaust gas and/or the catalyst and the sensed or simulated flow rate of the exhaust gas prior to the sensed or simulated temperature of the exhaust gas and/or the catalyst being equal to or above the predetermined threshold at the sensed or simulated flow rate, wherein controlling the volume and/or the pressure of the recirculated exhaust gas includes controlling a position of an exhaust valve configured to selectively divert the exhaust gas from the primary exhaust gas stream to the secondary exhaust gas stream and controlling an operating speed of a recirculation pump configured to pump at least some of the exhaust gas from the primary exhaust gas stream through the secondary exhaust gas stream.

5. The method of claim 4, wherein operation of the recirculation pump increases back pressures and temperatures of the recirculated exhaust gas by adding pumping work to the recirculated exhaust gas and increasing torque requirements of the engine during idling and partial load conditions.

6. The method of claim 1, wherein, during the exhaust gas recirculation process, heat is transferred by convection from the recirculated exhaust gas to the exterior surfaces of the aftertreatment device as the recirculated exhaust gas flows through the cavity of the housing, and to interior surfaces of the aftertreatment device as the recirculated exhaust gas flows through the aftertreatment device during the second treatment.

7. The method of claim 1, further comprising performing a third treatment on the recirculated exhaust gas within the primary exhaust gas stream with an additional aftertreatment device of the exhaust system downstream from the aftertreatment device, wherein the second position in the exhaust system is upstream from the additional aftertreatment device.

8. The method of claim 1, wherein the engine is a gasoline engine and the fuel is gasoline or the engine is a diesel engine and the fuel is diesel.

9. The method of claim 1, wherein the aftertreatment device comprises a catalytic converter.

10. A system comprising:

an engine configured to consume fuel and air and thereby generate exhaust gas;

an exhaust system configured to channel the exhaust gas within a primary exhaust gas stream from the engine to an outlet for emissions;

an aftertreatment device in the exhaust system;

an exhaust recirculation system configured to divert at least some of the exhaust gas within the primary exhaust gas stream as recirculated exhaust gas from a first position in the exhaust system downstream of the aftertreatment device, through a cavity defined between interior surfaces of a housing that encloses the aftertreatment device and exterior surfaces of the aftertreatment device such that at least some of the recirculated exhaust gas within the secondary exhaust gas stream contacts the exterior surfaces of the aftertreatment device, and from the housing to a second position in the exhaust system upstream of the aftertreatment device, wherein the recirculated exhaust gas defines a secondary exhaust gas stream within the exhaust recirculation system, wherein the recirculated exhaust gas within the secondary exhaust gas stream is combined with the exhaust gas within the primary exhaust gas stream at the second position; and a controller configured to, by a processor, selectively operate the exhaust recirculation system to perform an exhaust gas recirculation process that includes controlling the exhaust recirculation system to divert the exhaust gas from the primary exhaust gas stream to the secondary exhaust gas stream and thereby cause the recirculated exhaust gas within the secondary exhaust gas stream to be treated with the aftertreatment device more than once.

11. The system of claim 10, wherein the controller is configured to, by the processor:

initiate the exhaust gas recirculation process in response to the initiating operation of the engine; and end the exhaust gas recirculation process after the engine has been operating for a predetermined period of time.

12. The system of claim 10, wherein the controller is configured to, by the processor:

sense a temperature of the exhaust gas and/or a catalyst of the aftertreatment device or simulate the temperature of the exhaust gas and/or the catalyst of the aftertreatment device based on operating conditions of the engine and/or the exhaust system;

sense a flow rate of the exhaust gas or simulate the flow rate of the exhaust gas based on the operating conditions of the engine and/or the exhaust system;

initiate the exhaust gas recirculation process in response to the sensed or simulated temperature of the exhaust gas and/or the catalyst being below a predetermined threshold at the sensed or simulated flow rate; and end performance of the exhaust gas recirculation process after the sensed or simulated temperature of the exhaust gas and/or the catalyst is equal to or above the predetermined threshold at the sensed or simulated flow rate.

13. The system of claim 12, wherein the controller is configured to, by the processor:
   selectively control, with the processor, a volume and/or a pressure of the recirculated exhaust gas within the secondary exhaust gas stream based on the sensed or simulated temperature of the exhaust gas and/or the catalyst and the sensed or simulated flow rate of the exhaust gas prior to the sensed or simulated temperature of the exhaust gas and/or the catalyst is equal to or above the predetermined threshold at the sensed or simulated flow rate, wherein controlling the volume and/or the pressure of the recirculated exhaust gas includes controlling a position of an exhaust valve configured to selectively divert the exhaust gas from the primary exhaust gas stream to the secondary exhaust gas stream and controlling an operating speed of a recirculation pump configured to pump at least some of the exhaust gas from the primary exhaust gas stream through the secondary exhaust gas stream.

14. The system of claim 13, wherein operation of the recirculation pump increases back pressures and temperatures of the recirculated exhaust gas by adding pumping work to the recirculated exhaust gas and increasing torque requirements of the engine during idling and partial load conditions.

15. The system of claim 10, wherein, during the exhaust gas recirculation process, the exhaust recirculation system is configured to transfer heat by convection from the recirculated exhaust gas to the exterior surfaces of the aftertreatment device as the recirculated exhaust gas flows through the cavity of the housing, and to interior surfaces of the aftertreatment device as the recirculated exhaust gas flows through the aftertreatment device.

16. The system of claim 10, further comprising an additional aftertreatment device of the exhaust system downstream from the aftertreatment device that is configured to further treat the exhaust gas of the primary exhaust gas stream, wherein the second position in the exhaust system is upstream from the additional aftertreatment device.

17. The system of claim 10, wherein the engine is a gasoline engine and the fuel is gasoline or the engine is a diesel engine and the fuel is diesel.

18. The system of claim 10, wherein the aftertreatment device comprises a catalytic converter.

19. A vehicle comprising:
   an engine configured to consume fuel and air and thereby generate exhaust gas;
   an exhaust system configured to channel the exhaust gas within a primary exhaust gas stream from the engine to an outlet for emissions;
   an aftertreatment device in the exhaust system;
   an exhaust recirculation system configured to selectively divert at least some of the exhaust gas within the primary exhaust gas stream as recirculated exhaust gas from a first position in the exhaust system downstream of the aftertreatment device, through a cavity defined between interior surfaces of a housing that encloses the aftertreatment device and exterior surfaces of the aftertreatment device such that at least some of the recirculated exhaust gas within the secondary exhaust gas stream contacts the exterior surfaces of the aftertreatment device, and from the housing to a second position in the exhaust system upstream of the aftertreatment device, wherein the recirculated exhaust gas defines a secondary exhaust gas stream within the exhaust recirculation system, wherein the recirculated exhaust gas within the secondary exhaust gas stream is combined with the exhaust gas within the primary exhaust gas stream at the second position; and
   a controller configured to, by a processor, selectively operate the exhaust recirculation system to perform an exhaust gas recirculation process that includes controlling the exhaust recirculation system to divert the exhaust gas from the primary exhaust gas stream to the secondary exhaust gas stream and thereby cause the recirculated exhaust gas within the secondary exhaust gas stream to be treated with the aftertreatment device more than once;
   wherein, during the exhaust gas recirculation process, the exhaust recirculation system is configured to transfer heat by convection from the recirculated exhaust gas to the exterior surfaces of the aftertreatment device as the recirculated exhaust gas flows through the cavity of the housing, and to interior surfaces of the aftertreatment device as the recirculated exhaust gas flows through the aftertreatment device.

20. The vehicle of claim 19, wherein the controller is configured to, by the processor:
   sense a temperature of the exhaust gas and/or a catalyst of the aftertreatment device or simulate the temperature of the exhaust gas and/or the catalyst of the aftertreatment device based on operating conditions of the engine and/or the exhaust system;
   sense a flow rate of the exhaust gas or simulate the flow rate of the exhaust gas based on the operating conditions of the engine and/or the exhaust system;
   initiate the exhaust gas recirculation process in response to the sensed or simulated temperature of the exhaust gas and/or the catalyst being below a predetermined threshold at the sensed or simulated flow rate;
   selectively control, with the processor, a volume and/or a pressure of the recirculated exhaust gas within the secondary exhaust gas stream based on the sensed or simulated temperature of the exhaust gas and/or the catalyst and the sensed or simulated flow rate prior to the sensed or simulated temperature of the exhaust gas and/or the catalyst being equal to or above the predetermined threshold at the sensed or simulated flow rate, wherein controlling the volume and/or the pressure of the recirculated exhaust gas includes controlling a position of an exhaust valve configured to selectively divert the exhaust gas from the primary exhaust gas stream to the secondary exhaust gas stream and controlling an operating speed of a recirculation pump configured to pump at least some of the exhaust gas from the primary exhaust gas stream through the secondary exhaust gas stream; and
   end performance of the exhaust gas recirculation process after the sensed or simulated temperature of the exhaust gas and/or the catalyst is equal to or above the predetermined threshold at the sensed or simulated flow rate.

* * * * *